United States Patent [19]
Papadopoulos

[11] Patent Number: 5,777,476
[45] Date of Patent: Jul. 7, 1998

[54] GROUND GLOBAL TOMOGRAPHY (CGT) USING MODULATION OF THE IONOSPHERIC ELECTROJETS

[76] Inventor: Konstantinos Papadopoulos, 3705 Raymond St., Chevy Chase, Md. 20815

[21] Appl. No.: 569,774

[22] Filed: Dec. 8, 1995

[51] Int. Cl.⁶ .................. G01V 3/08; G01V 3/12
[52] U.S. Cl. .................. 324/334; 324/335; 324/344; 324/345
[58] Field of Search .................. 324/334, 335, 324/338, 344, 345, 348–350

[56] References Cited

U.S. PATENT DOCUMENTS

3,594,633  7/1971  Barringer .................. 324/344 X
5,148,110  9/1992  Helms .................. 324/344 X
5,260,660  11/1993  Stolarczyk .................. 324/338

*Primary Examiner*—Gerard R. Strecker
*Attorney, Agent, or Firm*—Rossi & Associates

[57] ABSTRACT

An apparatus and method for performing geological mapping utilizes an HF transmitter to heat ionospheric electrons to cause the current in an overhead electrojet to be modulated, thereby injected a low frequency EM signal into the Earth-ionosphere waveguide. A sensor measures vector values of electric and magnetic fields in an area to be surveyed. The measured vector values are provided to a processor that creates a conductivity map of the surveyed area based on the measured vector values.

15 Claims, 7 Drawing Sheets

GROUND GLOBAL TOMOGRAPHY (CGT) USING MODULATION OF THE IONOSPHERIC ELECTROJETS

FIELD OF THE INVENTION

The invention is directed in general to a method and apparatus for geophysical exploration. More specifically, the invention provides a method and apparatus for generating controlled low frequency electromagnetic pulses by causing controlled temporal interruptions in the ionospheric electrojets current and using the low frequency reradiated signal to map the conductivity structure of an underground or underwater structure.

BACKGROUND OF THE INVENTION

The objectives of geophysical surveys are to obtain information about the interior spatial distribution of one or more of the physical properties of the underground from a limited set of measurements of a related physical field made on the surface or any other accessible place. In electromagnetic (EM) techniques, which form the basis of the current invention, the most relevant ground property is the electrical conductivity and sometimes the electric and magnetic permeability. To determine the underground profile of any particular electrical property such as the conductivity, a low frequency electromagnetic signal remotely produced and propagating in the vicinity of the surveyed area is required. The signal induces current flow into the ground leading to the production of secondary EM fields, whose characteristics depend on the ground conductivity and wave frequency. The profile of the electrical property is then determined by measuring the vector electric and magnetic fields on the ground as a function of the temporal characteristics of the signal and inverting the data to provide tomographic maps of the underground conductivity distribution.

Figure 1:
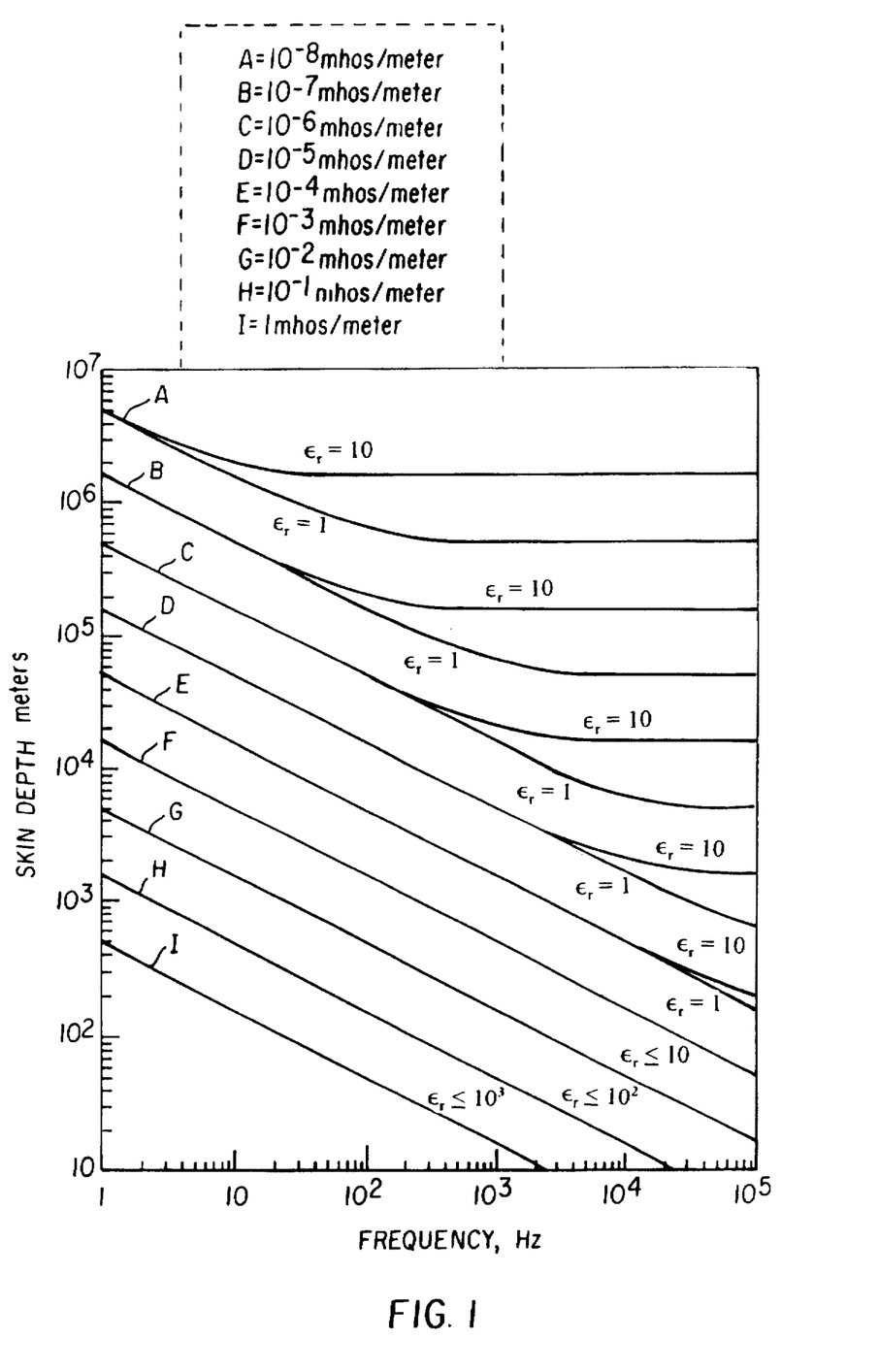
FIG. 1 illustrates a graph illustrating skin depth as a function of frequency for various conductivities and permitivities of most earth materials at normal temperatures and pressures are in the range of $10^{-4}$–1 mhos/m.
Figure 2:
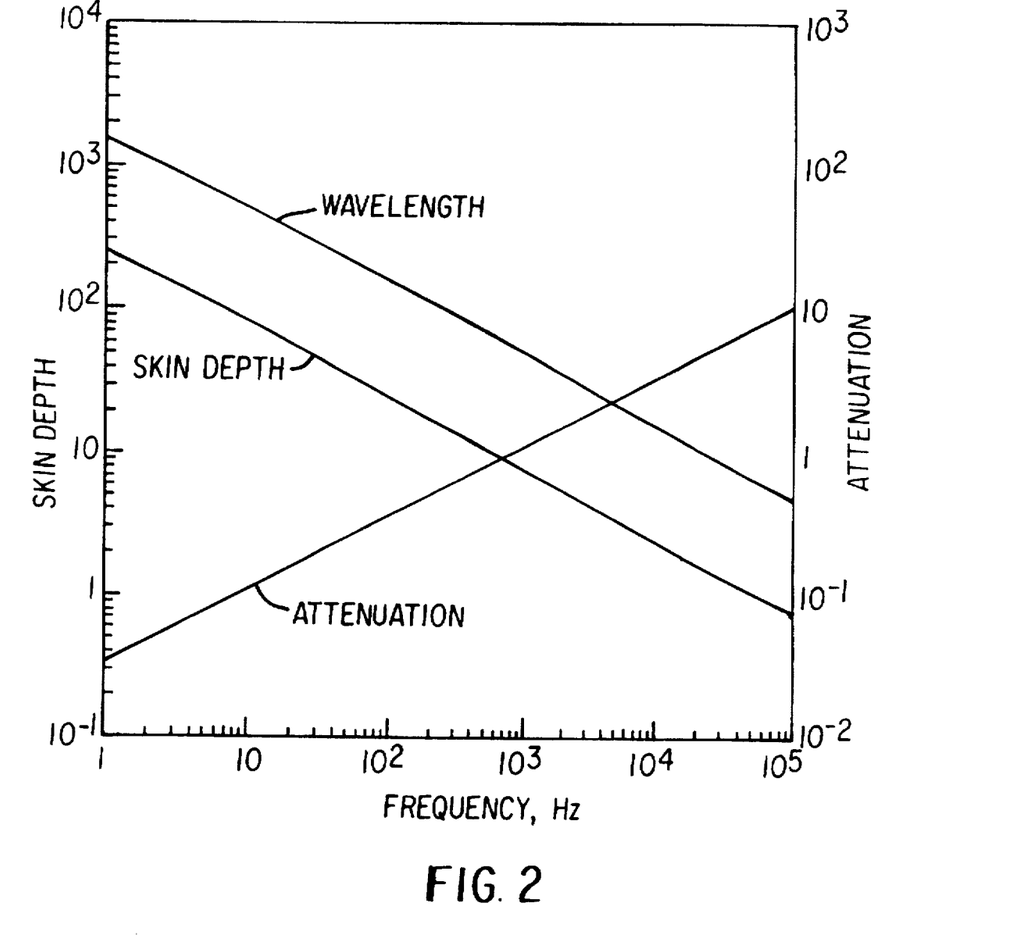
FIG. 2 illustrates the skin depth and the attenuation rate in sea water with σ=4 mhos/m.

A key physical principle upon which all EM techniques are based is the dependence of the penetration depth $\delta$ of the EM signal into the ground at the frequency of the EM signal (or equivalently on the signal pulse length $\tau$) and the ground conductivity. The value of the penetration depth is given:

$$\delta = 500(1/\sigma f)^{1/2} \text{ meters} \tag{1}$$

where $\sigma$ is the ground conductivity in mhos/m and f the wave frequency in Hertz. By changing the frequency or the pulse length depth investigation can be accomplished. As is clear from the graph provided in FIG. 1, very low frequencies, ranging from few MHz (milliherz) to tens of kHz (kiloherz) are required to achieve significant depth of investigation. This is especially true for ocean floor exploration due to the large value of the conductivity of the sea water as evidenced by the graph illustrated in FIG. 2.

Current EM exploration methods rely on either natural sources (NSEM) or controlled sources (CSEM) to provide the necessary waves. NSEM avoids the difficult problem of generating low frequency waves by relying on natural EM signals generated by lightning discharges or caused by magnetospheric currents. These methods, however, suffer from erratic and unpredictable signal form, strength, and polarization, poor coherence and lack power in critical frequency bands. The long stacking times required for low frequency data made them unattractive to commercial applications. Today they are of no use to commercial exploration and are primarily used as inexpensive low resolution deep exploration tool by University research groups.

The problems associated with NSEM led to the development of artificial sources and CSEM techniques. In these techniques electric or magnetic dipole sources are brought in the vicinity of the surveyed area to produce stronger and controlled signals. Such techniques are quite cumbersome and expensive since they require that power supplies and current control systems be brought to the surveyed site. For low frequencies and deep penetration large, truck mounted installations are required which causes logistics problems, restricted access to remote sites and can lead to undesirable environmental damage. Most importantly artificial sources lack frequency agility and the near field geometric character of the EM signal (i.e. non-plane wave) complicates and often makes impossible the structural definition of the conductivity.

In view of the above, it is an object of the invention to provide a novel apparatus and technique for underground and seafloor geophysical exploration having a wide range of applications, including petroleum, mineral, fossil and geothermal resource exploration, ground-water exploration and development, engineering and environmental investigations, archeological investigations, underwater target detection, imaging of underground structures and general geological tomographic mapping, that does not have the limitations of the conventional methods discussed above.

SUMMARY OF THE INVENTION

The invention presents an alternative to low frequency EM exploration without the drawbacks of the NSEM or CSEM techniques discussed above. In accordance with the invention, a source of the low frequency signal is located in the lower ionospheric plasma at altitudes between 70–100 km above the ground and can be located even thousands of kilometers from the surveyed site. The low frequency signal is triggered and its characteristics and frequency controlled by using a powerful HF transmitter in the frequency range 2–15 MHz which is frequency, phase or amplitude modulated.

The HF transmitter is optimally located in geographic areas whose ionosphere is permeated by electrical currents, known as ionospheric electrojets. Such areas are at northern latitudes (auroral electrojet) or in the equatorial zone (equatorial electrojet). The interaction of the modulated HF signals with the electrojet current results in the generation of secondary low frequency EM signals, as described in "Effect of the Ionosphere on Radiowave Systems", Chang et al., edited by J. M. Goodman, p. 91, U.S. Government Printing Office, Washington, D.C. (1981) and "Electrojet Modulation ELF Communications", Papadopoulos et al., Proceedings of AGARD EEP Symposium, Bergen, Norway (1990), the contents of which are herein incorporated by reference, which are injected into the waveguide formed by the conducting ground and ionosphere, referred to as the Earth-Ionosphere Ionosphere (EIW). These low frequency signals propagate to the surveyed site in the EIW suffering low attenuation as described in "Excitation of the Earth Ionosphere Waveguide by an ELF Source in the Ionosphere", Tripathi et al., Radio Science, Vol. 17, pp. 1321–1326 (1982), the contents of which are herein incorporated by reference.

The underground conductivity profile is deduced by measuring the vector electric and magnetic fields on the ground as a function of the temporal characteristics of the HF modulation. The signal generated by the interaction of the modulated HF fields with the ionosphere has the ideal plane wave characteristics required for underground probing. A few properly selected sites with HF transmitters can therefore provide worldwide source coverage for exploration.

The invention combines the advantages of NSEM and CSEM techniques without their disadvantages and is preferably referred to as Global Ground Tomography or GGT.

BRIEF DESCRIPTION OF THE DRAWINGS

The invention will be described in greater detail with reference to certain preferred embodiments and the accompanying drawings, wherein.

DETAILED DESCRIPTION OF THE PREFERRED EMBODIMENTS

Figure 3:
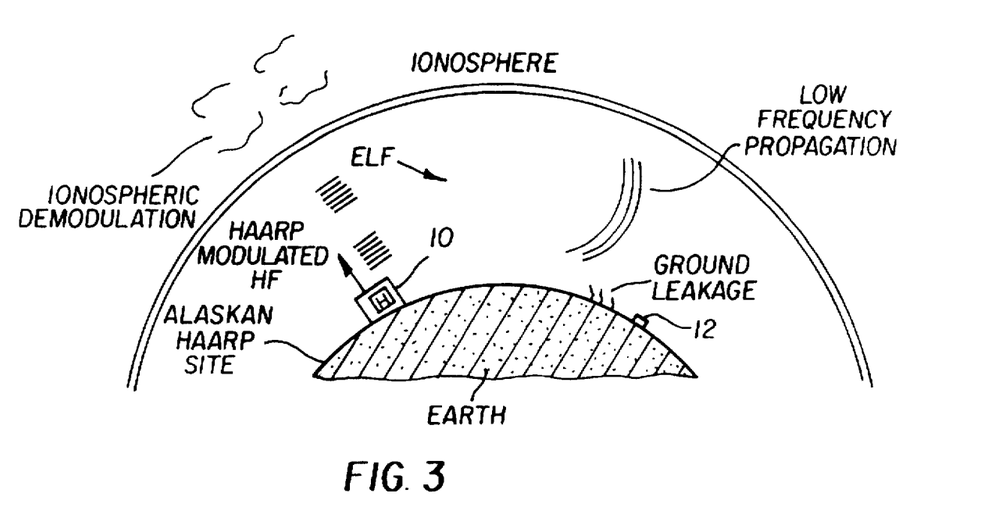
FIG. 3 illustrates a system operating on the GGT principle according to the invention.

A schematic of the invention set up is illustrated in FIG. 3. A powerful HF transmitter 10, preferrably with a frequency in the range of 2–15 MHz, is located underneath the auroral or the equatorial electrojet and is used to modulate the natural overhead ionospheric current by heating ionospheric electrons thereby injecting low frequency EM signals into the EIW. The transmitter 10 includes modulation circuitry 11 that modulates the output from the transmitter 10 using either frequency, phase (for example by sweeping a beam) or amplitude modulation. For example, the HF Active Auroral Research Program (HAARP) facility located at Gakona, Ak., described in "HAARP Research and Applications: A Joint Program of Phillips Laboratory and the Office of Naval Research", Naval Research Laboratory, Washington, D.C. (1995), has a transmitter that can be utilized in accordance with the invention. The frequency and pulse shape of the signals are controlled by the modulation characteristics of the radiated HF waves transmitted by the transmitter 10. These signals propagate with weak attenuation in the EIW to the surveyed site and penetrate into the underground. The electric and magnetic fields are measured over the surveyed site, using one or more conventional electric and magnetic sensors 12. The sensors can be located on the surface, on low flying airplanes or underground. Both the amplitude and the phase of the fields are measured.

The data from the sensors 12 are supplied to a processing unit 14, which can be located at a site remote from the sensors 12. The data are then inverted to provide the desired conductivity profiles. The inversion algorithms utilized by the processing unit 14 are based on the physical principle that the signal penetration depth depends on the structure of the underground conductivity profile and the temporal characteristics of the HF modulation.

The key embodiments of the present invention can be understood by referring to FIGS. 3–8. The ground based transmitter 10 illustrated in FIG. 3 has a frequency ωHF in the HF frequency band and radiates upwards amplitude or frequency modulated signals at a lower frequency ω. The modulated signal interacts with the ionospheric plasma carrying the electrojet current and is demodulated. The demodulated low frequency signal has temporal characteristics of the modulation amplitude. It couples to the EIW and propagates with low attenuation to the surveyed site. The EM signals generated by the interaction of the ionosphere with the modulated HF signal are equivalent to those generated by a Horizontal Magnetic Dipole (HMD) source located in the interaction region. At large distances from the source the EM fields measured near the surface of an infinitely conductive ground, consist of a vertical electric field component $E_z$ and a horizontal magnetic field component Hy, where we have assumed that at great distances from the HF transmitter the curvature of the earth and of the field components, on a local scale are negligible, and the local EM field components can be viewed as those of a plane wave impinging at grazing angle on the Earth's surface. For an infinitely conducting ground the electric and magnetic fields do not penetrate into the ground, but they are totally reflected.

Figure 4:
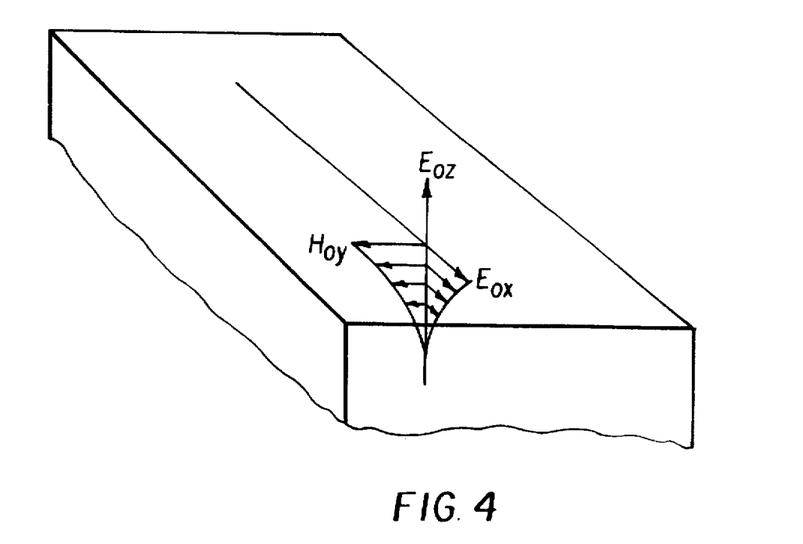
FIG. 4 illustrates the penetration of the low frequency signals generated remotely by the interaction of the HF with the ionospheric currents into the conducting ground of the surveyed site.
Figure 5:
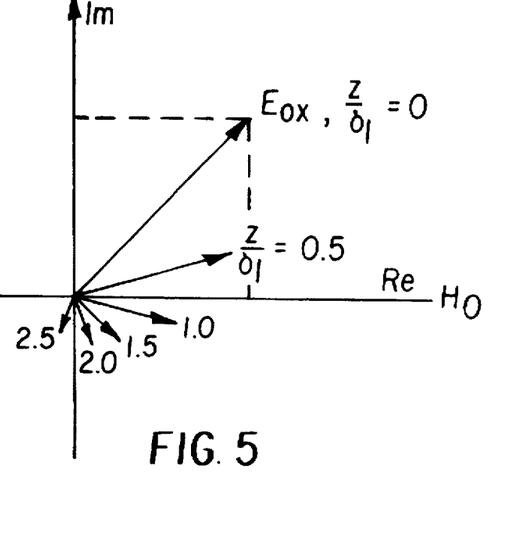
FIG. 5 illustrates the behavior of the phase of $E_x$ with depth if the phase of Hy on the ground is taken as a reference.
Figure 6:
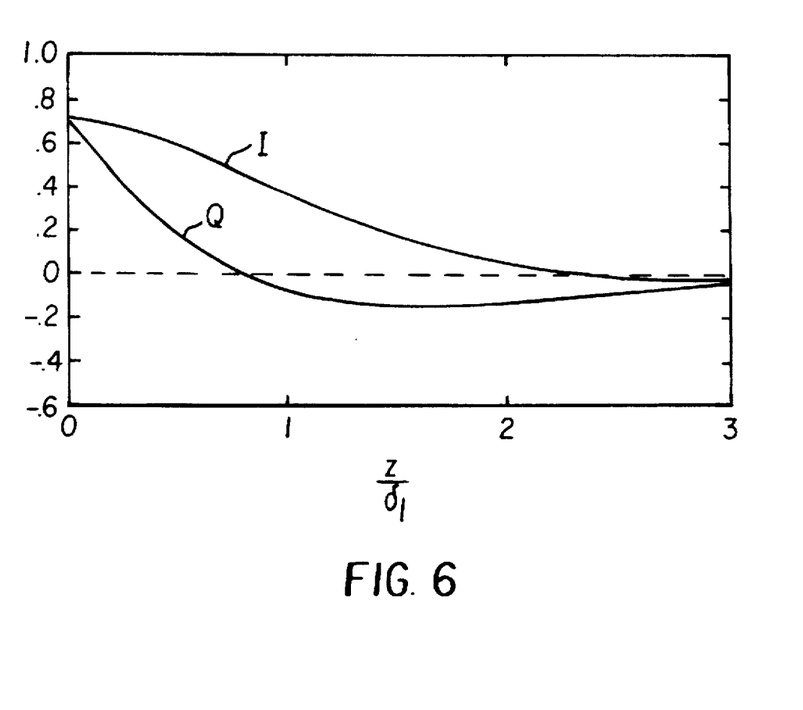
FIG. 6 illustrates the behavior of the inphase (I) and quadrature phase (Q) of $E_x$ and of the induced current as a function of depth, normalized to their values at the surface.

The situation changes when the low frequency signal propagates over a ground with uniform finite conductivity σ. In this case the horizontal magnitude field diffuses into the ground inducing a changing horizontal electric field at right angles, through Faraday's law (FIG. 4). The behavior of the fields below the ground is a standard textbook problem. See, for example, Jackson, J. D., Classical Electrodynamics, John Wiley & Sons, New York (1962). The orthogonal electric and magnetic fields below a homogeneous ground with uniform conductivity σ due to a signal with frequency ω are $$E_x(z,t)=H_o(2\sigma/\mu\omega)^{-\frac{1}{2}}\exp(-iz/\delta)\exp(-z/\delta)\exp(i\omega t) \quad (2a)$$

$$Hy(z,t)=H_o\exp(-iz/\delta)\exp(-z/\delta\exp(i\omega t(-i\pi/4)) \quad (2b)$$

where $H_o$ is the value of the magnetic field on the surface (z=0). It can be easily shown that $H_o$ has a value equal to twice the value of the free space horizontal magnetic field. Equations (2a) and (2b) provide the algorithm necessary to extract information about the underground conductivity by measuring the fields on the surface (z=0). If the complex ground impedance $Z_{xy}$ is defined as described by Vozzof in Electromagnetic Methods in Applied Geophysics, Volume 1, pp. 641-711, Tulsa, Okla.: SEG (1987):

$$Z_{xy}=E_x/H_y$$

then $$Z_{xy}=(1+I)(\mu\omega 2\sigma)^{1/2} \quad (3)$$

or solving for the resistivity ρ=1/σ we find that $$\rho_{xy}=(Z_{xy}Z^*\,xy)/(\mu\omega) \quad (4)$$

where Z* is the complex conjugate of Z. The quantity ρxy is known as the apparent resistivity. The phase φ of Z is the phase difference between E and H. From Eqs. (2a), (2b) or (3) it can be seen that for a uniform half space $E_x$ must lead Hy by 45 degrees. In this uniform half space model the resulting ρxy will be the same at all frequencies and for all directions, i.e., invariant on interchanging x and y. FIG. 5 illustrates the behavior of the phase of $E_x$ and of the induced current as a function of depth, normalized to their values at the surface.

Figure 7:
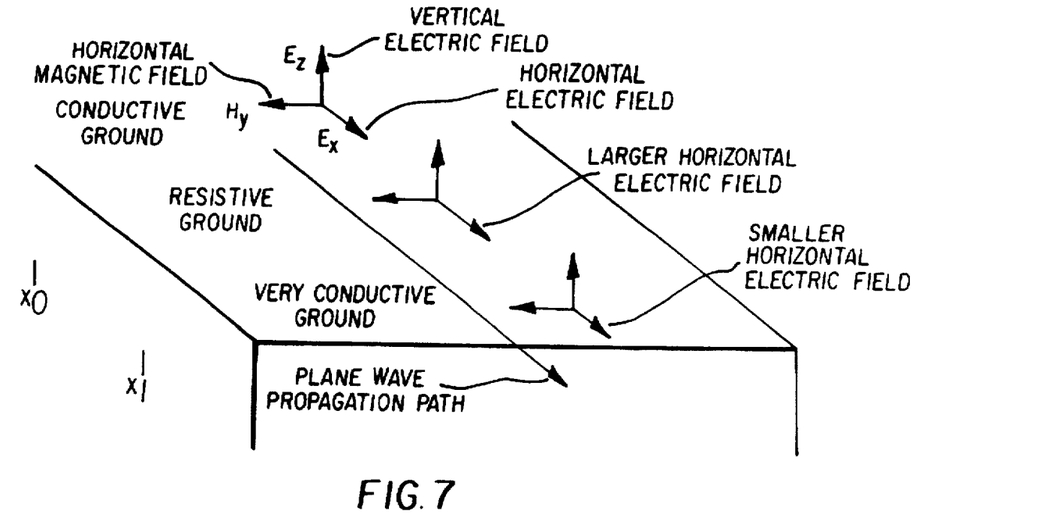
FIG. 7 illustrates the variation of the horizontal electric field as the wave propagates across regions of discontinuity in the conductivity value.
Figure 8:
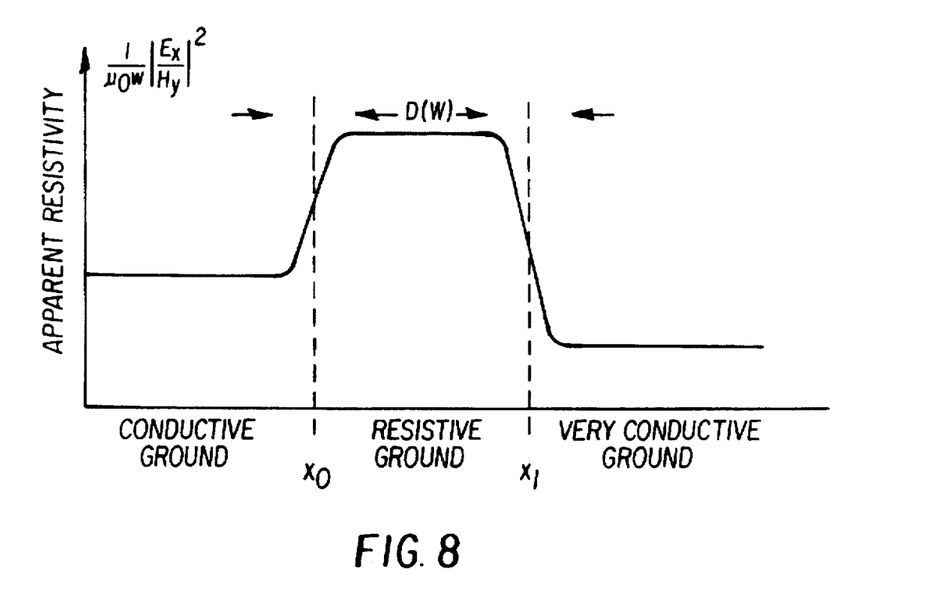
FIG. 8 illustrates the characteristic signature of the apparent resistivity of the x-direction for the case of FIG. 7.

For more complicated underground structures, the relationships between the E and H fields becomes more complex. FIG. 7 illustrates the variation of the fields measured on the ground as a function of measurement location for the case that the conductivity has a variation along the x-direction but is uniform in depth. The location of the conductivity discontinuities is easily recognized from the discontinuity in the value of the apparent resistivity as shown in FIG. 8.

Figure 9:
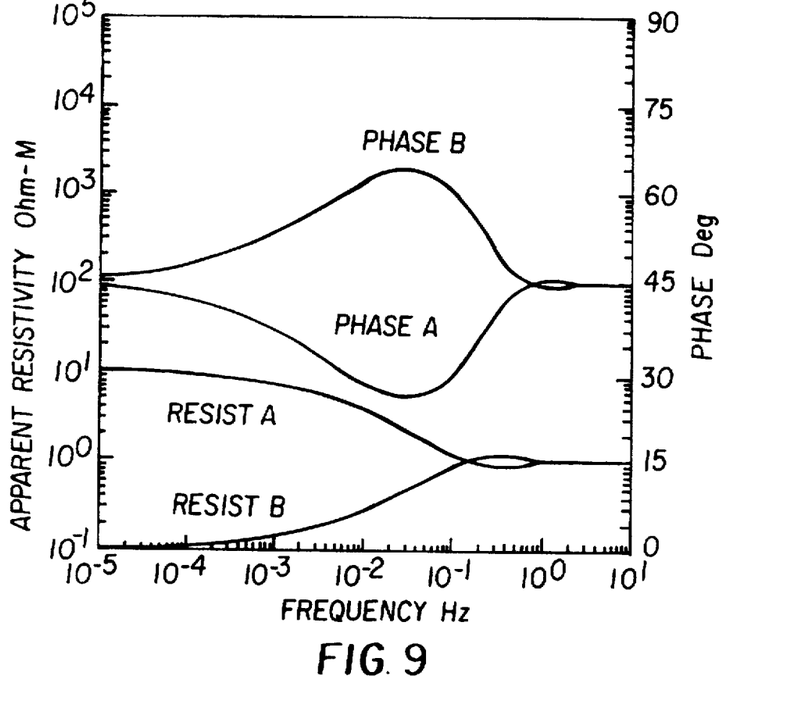
FIG. 9 illustrates the characteristic response of horizontal two layer structure, wherein Model A corresponds to resistive basement while model B to conductive basement.
Figure 10:
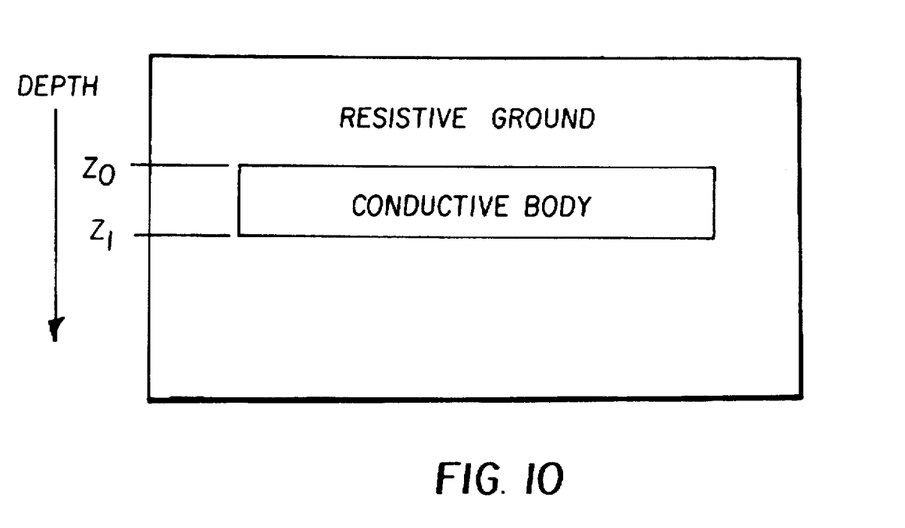
FIG. 10 illustrates the response of a long conductive body buried in a resistive medium.

For the case of horizontal layers some energy is reflected at each interface in addition to internal reflections. The fields remain horizontal and at right angles to each other unless there is anisotropy in the horizontal plane. The field behavior for this case is illustrated in FIG. 9 for the case of two layers. One with resistive and the other with conductive basement while the top layer is the same for both models. The figure shows the expected behavior of the phase and the amplitude of the resistivity as a function of frequency At high frequencies when the skin depth is smaller than the layer thickness the apparent resistivity is equal to the resistivity of the top layer. With decreasing frequency the skin depth increases and the second layer is sensed. For very low frequencies the influence of the top layer becomes negligible and the apparent resistivity approaches the value of the resistivity of the bottom layer. The overshoots and undershoots in the apparent resistivity and phase with decreasing frequency allow for localization of the interface. The principles of the two layer field structure can be easily extended to the multilayer structures and to conductive or resistive bodies embedded in a uniform ground as shown in FIG. 10. In anisotropic media the apparent conductivity varies with the direction of the electric field of the signal, or equivalently with the signal polarization with respect to the direction of the anisotropy. In this case Ohm's law has a tensor for and, using the standard summation convention, the current density j is given by $$j_{mn} = \sigma_{ml} E_{ln} \quad (5)$$

Figure 11:
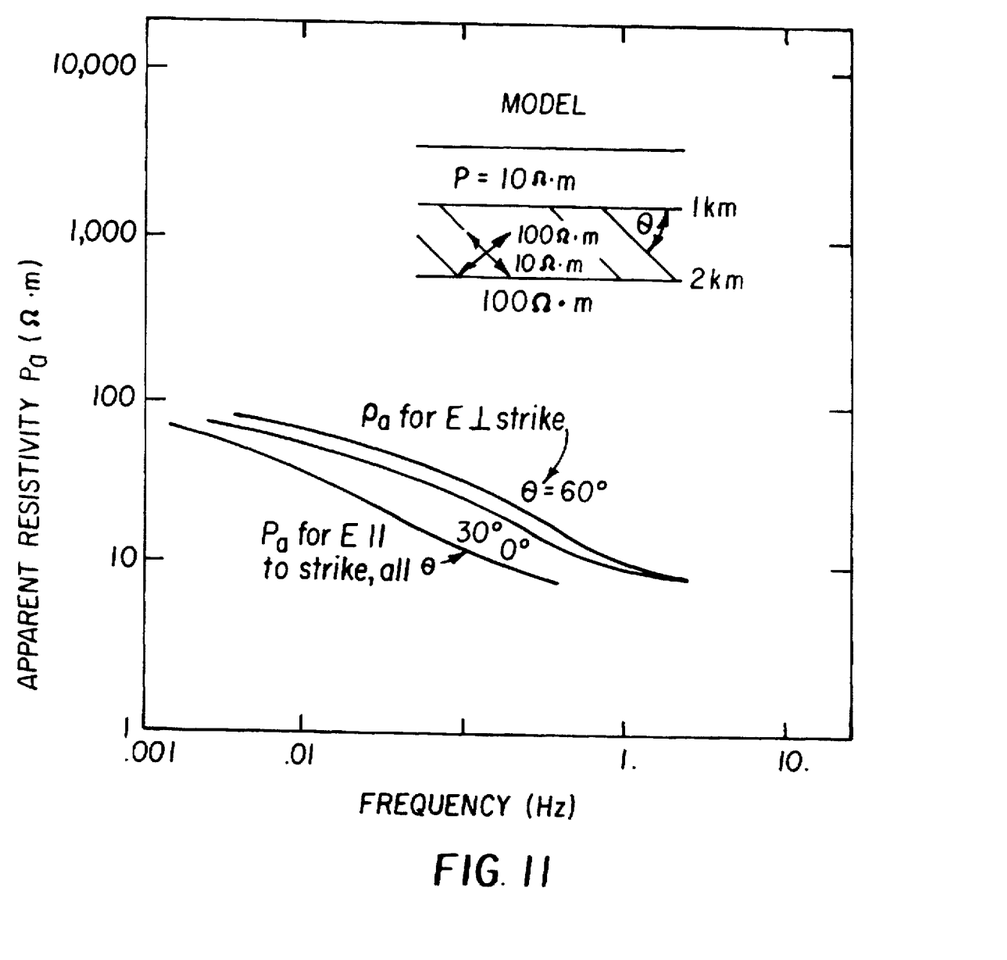
FIG. 11 illustrates the effect on apparent resistivity of anisotropy on the second layer of a three layer model, wherein Theta is the dip of the smaller principal resistivity axis.

As a result the current and the electric will no longer be in the direction perpendicular to H. The effect of anisotropy is illustrated in FIG. 11 for a three horizontal layer medium. The apparent resistivity is a function of the measurement direction.

While the above considerations refer to the case of harmonic modulation, it is straightforward to extend them to the case other temporal modulation forms by examining the field behavior for step function excitation. The time domain analogs of Eqs. (2a), (2b) for a step function excitation at t=0 with magnetic field amplitude h are $$e_x(z,t) = (h/\sigma)(\sigma\mu/\pi t)^{1/2} \exp[-(\sigma\mu/2t)(z^2/2)(z^2/2)] \quad (6a)$$

$$h_y(z,t) = h \, erfc[(\sigma\mu/t)^{1/2}(z/2)] \quad (6b)$$

where erfc is the complementary error function. From Eqs. (6a), (6b) it is clear that the penetration depth depends on the pulse length t, and is equivalent to Eq. (1) with t replaced by 1/ω, with ω=2πf. Conductivity profiles on the time domain are obtained by varying the pulse length and measuring the decay of the induced currents (fields) on the ground. More detailed analysis of the interaction of low frequency EM waves with inhomogeneous and anisotropic ground and the relevant inversion techniques can be found in Nabighian, N., Electromagnetic Methods in Applied Geophysics, Vols. 1 & 2, Tulsa, Okla.: SEG (1987).

The invention has been described with reference to certain preferred embodiments thereof. It will be understood, however, that modifications and variations are possible within the scope of the appended claims. For example, the data from the sensors can either be directly supplied to a processing unit or stored for later processing

What is claimed is:

1. An apparatus comprising:
   transmitting means for transmitting a signal into the ionosphere of the Earth, wherein the transmitted signal generates heating of ionospheric electrons to cause current in an overhead electrojet to be modulated, thereby injecting an EM signal into the Earth-ionosphere waveguide;
   sensing means for measuring vector values of at least one of electric and magnetic fields affected by the EM signal in an area of the earth to be surveyed; and
   processing means for processing the vector values of the electric and magnetic fields measured by the sensing means in order to generate a map of the subsurface physical properties of the surveyed area.

2. An apparatus as claimed in claim 1, wherein the transmitting means includes an HF transmitter and modulation means for modulating a transmitted power of the HF transmitter.

3. An apparatus as claimed in claim 2, wherein the modulation means performs amplitude modulation of the transmitter power.

4. An apparatus as claimed in claim 2, wherein the modulation means performs frequency modulation of the transmitter power.

5. An apparatus as claimed in claim 2, wherein the modulation means performs phase modulation of the transmitter power.

6. An apparatus as claimed in claim 2, wherein the HF transmitter operates in a frequency range of about 2–15 MHz.

7. An apparatus as claimed in claim 2, wherein the modulation means modulates the transmitter power at a frequency of between about 0.001 Hz and 50 kHz.

8. An apparatus as claimed in claim 2, wherein the HF transmitter is positioned and directed to deposit energy at an altitude of between about 70–100 km.

9. A method of performing geological mapping comprising the steps of:
   transmitting a signal into the ionosphere of the Earth with an HF transmitter to generate heating of ionospheric electrons to cause current in an overhead electrojet to be modulated, thereby injecting an EM signal into the Earth-ionosphere waveguide;
   measuring vector values of at least one of electric and magnetic fields affected by the EM signal in an area of the earth to be surveyed with at least one sensor; and
   processing the vector values of the electric and magnetic fields measured by the sensor with a processing unit to generate a map of the subsurface physical properties of the surveyed area.

10. A method of performing geological mapping as claimed in claim 9, wherein the step of heating ionospheric electrons includes the step of modulating a transmitter power of the HF transmitter.

11. A method of performing geological mapping as claimed in claim 10, wherein the step of modulating the transmitter power includes frequency modulation.

12. A method of performing geological mapping as claimed in claim 10, wherein the step of modulating the transmitter power includes amplitude modulation.

13. A method of performing geological mapping as claimed in claim 10, wherein the step of modulating the transmitter power includes phase modulation.

14. A method of performing geological mapping as claimed in claim 9, wherein the HF transmitter is operated at a frequency of about 2–15 MHz.

15. A method of performing geological mapping as claimed in claim 10, wherein the transmitter power is modulated at a frequency of between about 0.001 Hz and 50 kHz.

* * * * *